DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUG. 1, 1972

901 O.G. 8

T901,007

PROCESS FOR MAKING SMOOTH VAPOR-PERMEABLE MICROPOROUS SHEET MATERIALS

Tirunillayi S. Govindan, Madison, Tenn., assignor to E. I. du Pont de Nemours and Company, Wilmington, Del.

Continuation of abandoned application Ser. No. 805,880, Mar. 10, 1969. This application May 27, 1971, Ser. No. 147,628

Int. Cl. B44d *1/44*

U.S. Cl. 117—63

No Drawing. 13 Pages Specification

A process for making vapor-permeable, microporous sheet materials by (a) preparing a solution of polymeric material in an organic solvent, (b) applying the polymeric solution to a fibrous substrate to produce a substrate coated with a layer of polymer solution, (c) bathing the coated substrate with a mixture of solvent and non-solvent that is at least partially miscible with said solvent for the polymer in the solution in (a) to produce a microporous polymer layer on the substrate, and (d) removing substantially all of the solvent and non-solvent from the microporous polymer layer, wherein a wetting liquid is applied to the substrate side of the coated substrate during the bathing step (c). The substrate is typically a non-woven fabric containing a solidified polymeric impregnant having a porous moisture-permeable structure. The wetting solution is water or an aqueous solution with a water miscible organic solvent preferably with a wetting agent selected from the group consisting of alkyl phenoxy-polyethoxy alcohols, sodium N-methyl-N-oleoyl taurate, polyethylene oxy-derivatives and polyoxyethylated alcohols. The polymer solution is preferably a dispersion of a mixture of polyurethane and polyvinyl chloride.